United States Patent [19]
Bell

[11] 3,838,831
[45] Oct. 1, 1974

[54] VEHICLE SENSITIVE RETRACTOR

[75] Inventor: Lon E. Bell, Altadena, Calif.

[73] Assignee: Technar, Incorporated, Pasadena, Calif.

[22] Filed: Dec. 6, 1972

[21] Appl. No.: 312,534

[52] U.S. Cl............................ 242/107.4, 188/139
[51] Int. Cl...................... A62b 35/02, B65h 63/00
[58] Field of Search.......... 242/107.4, 107 R, 107.2, 242/107.3, 107.5, 107.6, 107.7, 107 SB; 297/386, 387, 388; 280/150 SB; 188/135, 139

[56] References Cited
UNITED STATES PATENTS

| | | | |
|---|---|---|---|
| 3,226,053 | 12/1965 | Petty............................. | 242/107.4 |
| 3,343,765 | 9/1967 | Baker............................ | 242/107.4 |
| 3,430,891 | 3/1969 | Burleigh........................ | 242/107.4 |
| 3,489,367 | 1/1970 | Kovacs et al. ................. | 242/107.4 |
| 3,508,720 | 4/1970 | Kell.............................. | 242/107.4 |
| 3,578,260 | 5/1971 | Kell.............................. | 242/107.4 |
| 3,722,824 | 3/1973 | Hayashi ........................ | 242/107.4 |
| 3,741,494 | 6/1973 | Fiala............................. | 242/107.4 |

*Primary Examiner*—John W. Huckert
*Assistant Examiner*—Jon W. Henry
*Attorney, Agent, or Firm*—Jonathan Plaut; Ernest D. Buff

[57] ABSTRACT

A vehicle sensitive safety belt retractor is provided with actuating means responsive to acceleration of the vehicle for moving pawl means into engagement with ratchet means mounted on a belt strap reel of the retractor, and thereby preventing protraction of the belt. The actuating means includes mounting means provided with an open-ended upwardly extending projection and pendulum means in contact with the pawl means and freely suspended from the top of the projection. Sliding friction, as well as entrapment of dirt particles and corroded material between the pendulum means and the top of the projection, is substantially avoided. The retractor is highly reliable in operation and inexpensive to maintain.

9 Claims, 1 Drawing Figure

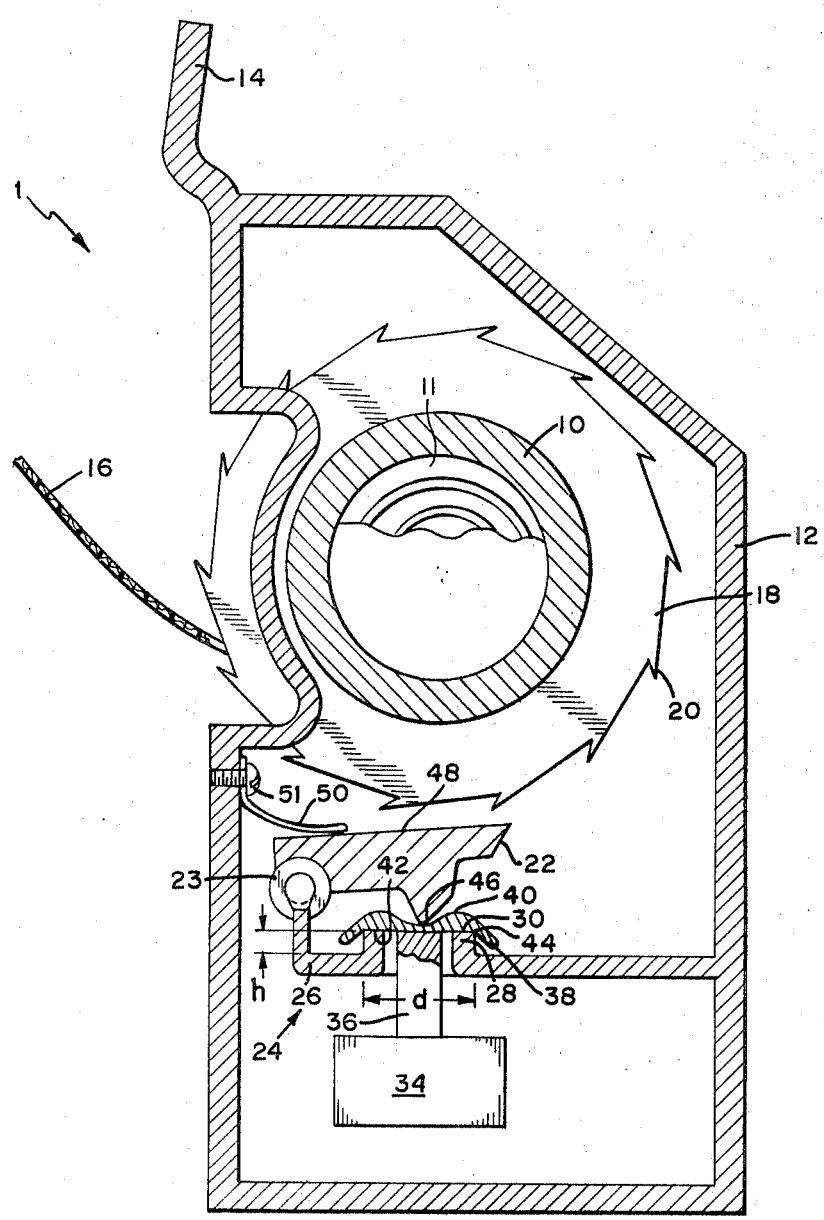

VEHICLE SENSITIVE RETRACTOR

BACKGROUND OF THE INVENTION

1. Field of the Invention

This invention relates to seat belt retractors for passengers in vehicles such as automobiles, and more particularly to an inertia responsive safety belt retractor which is vehicle sensitive, that is to say, one responsive to acceleration of the vehicle, for preventing protraction of the belt upon a predetermined acceleration of the vehicle. It is intended that the term "acceleration" as used herein includes the effect produced by cornering and braking.

2. Description of the Prior Art

Vehicle sensitive safety belt retractors have been recently developed which should significantly decrease the number of fatalities and serious injuries resulting from motor vehicle accidents. Most of these retractors include a belt reel which is continually biased in a retracting direction, a pawl which is engageable with ratchet teeth on the end of the belt reel, and an actuating mechanism having a pendulum in contact with the pawl and freely suspended from a ball and socket type mount. When the pendulum is displaced from its normally vertical position by an acceleration of the vehicle, it moves the pawl into engagement with the ratchet teeth, preventing further protraction of the belt. It is obviously of prime importance that the force necessary for displacement of the pendulum from the vertical position be correctly established and maintained at the magnitude necessary for proper actuation of the pawl. This requirement has, however, been difficult to meet. Particles of dirt and corroded material entrapped between the ball and the socket, as well as the sliding friction generated therebetween, can alter the acceleration required to displace the pendulum by a magnitude as high as one hundred percent or more. Unless regularly serviced, the actuating mechanism of the retractor may become insufficiently reliable in operation when subjected to changing climatic conditions for prolonged periods of time. For the above reasons, retractors of the type described generally result in lower reliability factors and higher maintenance costs than are considered to be commercially acceptable.

SUMMARY OF THE INVENTION

The present invention provides an inertia responsive and vehicle sensitive seat belt retractor having an actuating means which is highly reliable in operation and inexpensive to maintain. The retractor in which the actuating means is incorporated comprises a support means, reel means rotatably mounted on the support means, belt means attached to the reel means for protraction and retraction with respect thereto, biasing means for urging the reel means in a retracting direction, ratchet means mounted on the reel means for rotation therewith and pawl means mounted on the support means for engaging the ratchet means to stop rotation of the reel means, thereby preventing further protraction of the belt means. The actuating means incorporated in the retractor is responsive to acceleration of the vehicle and includes: (1) mounting means comprising an arm provided with an open-ended upwardly extending projection having its top substantially parallel to the floor of the vehicle and (2) pendulum means freely suspended from the mounting means and comprising a pendulum weight on the lower end of a shaft connected at its upper end to a cap having its upper surface contacting the pawl means and its lower surface supported by the top of the projection.

During normal operation of the vehicle, the pendulum means remains in a substantially vertical position. The pawl means does not engage the ratchet means and the belt means can be protracted and retracted to suit the convenience of the occupant. Acceleration of the vehicle which is greater than a preselected magnitude causes the pendulum means to be displaced from its substantially vertical position. This displacement operates to move the pawl means into engagement with the ratchet means, thereby preventing further protraction of the belt means.

The apparatus of this invention has advantageous structural features. A unique pivoting movement provided by the cap and the top of the projection substantially eliminates sliding friction, as well as the entrapment of dirt particles and corroded material therebetween. Thus, the acceleration required for proper actuation of the pawl means can be sustained at the preselected magnitude without periodic maintenance for a prolonged period of time. Moreover, the pivotal movement between the cap and the top of the projection provides a detent action which prevents movement of the pendulum means due to accelerations of the vehicle below the preselected magnitude, such as those generated by road noise and the like. The pendulum means remains in the substantially vertical position and is not set in motion until its actuating movement is required. Hence, the mounting means is less subject to wear and the distance moved by the pendulum means during actuation of the pawl means remains constant. As a result, the vehicle sensitive retractor of the present invention has higher reliability and lower maintenance costs than retractors inertially actuated by a pendulum suspended from a ball and socket type mount.

BRIEF DESCRIPTION OF THE DRAWING

The invention will be more fully understood and further advantages will become apparent when reference is made to the following detailed description and the accompanying drawing, which is a longitudinal section through one form of a vehicle sensitive safety belt retractor incorporating the present invention with a cutaway section showing a portion of the biasing means.

DETAILED DESCRIPTION OF THE DRAWING

Referring to the drawing, there is illustrated one form of a vehicle sensitive safety belt retractor incorporating the actuating means of the present invention. Other forms of the retractor can also be used. The retractor, shown generally at 1 in the drawing, should therefore be interpreted as illustrative and not in a limiting sense. As illustrated, the retractor 1 has a reel means 10 connected to a shaft 10 rotatably mounted on a support means 12. The support means 12 is a load bearing member and is provided with a mounting means 14 in the form of a rigid extension adapted to be bolted or otherwise secured to an anchorage point on the vehicle (not shown). A belt means 16, formed of a flexible nylon web or the like, is attached to the reel means 10 for protraction and retraction with respect thereto. The reel means 10 is provided with a biasing means, such as a torsion return spring 11 or the like, for biasing in a conventional manner the reel means 10 in a retraction direction. Fixedly mounted on the reel means 10 for rotation therewith is a ratchet means 18, the periphery of which has a plurality of circumferentially spaced ratchet teeth 20 formed by closely spaced notches or slots. As shown in the drawing, the ratchet means 18 may be directly mounted on the reel means 10. However, the definition of "ratchet means" in this specification is intended to include structure, including ratchet teeth, connected to but not direclty mounted on the reel means (for example, said structure utilized for webbing sensitive inertia locking described in U.S. patent application Ser. No. 162,073 filed July 13, 1972, which is incorporated herein by reference thereto). A pawl means 22 is mounted on pivot 23 journaled on the support means 12 for engaging the ratchet means 18 to stop rotation of the reel means 10, thereby preventing further protraction of the belt means 16. The pawl means 22 is moved into engagement with the ratchet means 20 by an actuating means, shown generally at 24, which is responsive to acceleration of the vehicle. Each of the reel means 10, support means 12, mounting means 14, ratchet means 18 and pawl means 22 is generally constructed of a suitable metal, such as heat treated steel or the like.

The actuating means 24 has a mounting means comprising an arm 26 which may be welded or otherwise attached at each end to the support means 12 for increased rigidity, but which, of course, need not have both its ends joined to a supporting member. Arm 26 is provided with an open-ended upwardly extending projection 28, preferably of cylindrical configuration, having its top 30 substantially parallel to the floor of the vehicle (not shown). The arm 26 and projection 28 can consist of a unitary member or be composed of two separate elements formed, for example, of mild steel. Actuating means 26 further includes a pendulum means comprising a pendulum weight 34 on the lower end of a shaft 36 connected at its upper end to a cap 38. The shaft 36 extends through the open-ended projection 28 in a substantially vertical direction so that the upper surface 40 of cap 38 contacts pawl means 22 and the lower surface 42 of cap 38 is supported by the top 30 of the projection 28. Each of the components of the pendulum means can be made of a suitable plastic material, such as nylon or polytetrafluoroethylene. Alternatively, the pendulum weight 34 can be made of lead or other metal which is relatively heavy and dense, and the shaft 36 and cap 38 can be made of plastic material of the type described or a suitable metal such as heat treated steel, brass or the like. The various components of the pendulum means can be separately formed and then assembled, or integrally formed into a unitary structure by a molding operation.

During normal operation of the vehicle, the pendulum means remains freely suspended from the mounting means in a vertical position, with the result that the lower surface 42 of cap 38 contacts and is supported by substantially the entire surface area of the top 39. The pawl means 22 rests on the upper surface 40 of cap 38 and does not engage the ratchet means 18. As a result, the belt can be protracted and retracted at any rate convenient to the occupant without inadvertently locking the retractor 1. Acceleration of the vehicle above a preselected magnitude, as in the order of about 0.1 g and preferably at least 0.3 causes the pendulum to be displaced from the substantially vertical position. The cap 38 pivots on the mounting means until the lower surface 42 contacts a relatively small portion of the outer edge 44 thereof. Simultaneously, the upper surface 40 of cap 38 rises in a substantially vertical direction and moves the pawl means 22 into engagement with the ratchet teeth 20 of ratchet means 18, thereby preventing further protraction of the belt.

The acceleration required for displacement of the pendulum means from its substantially vertical position depends upon the outside diameter, $d$, of the top 30, the weight of the pawl means 22 and the distance between the center of mass of the pendulum weight 34 and a substantially horizontal plane passing through the top 30. A representative example of the retractor 1 has a top 30 having an outside diameter, $d$, of 0.3 inch, a pawl means 22 weighing 3 grams and a pendulum weight 34 having its center of mass located 0.5 inch from a substantially horizontal plane passing through the top 30 of projection 28. Thus constructed, the retractor 1 is responsive to acceleration in the order of about 0.5 g in the substantially horizontal plane. Of course, the retractor 1 can be differently constructed so as to respond to acceleration having a different magnitude. Hence, the retractor 1 can have a top 30 having an outside diameter, $d$, of about 0.1 to 2 inches, a pawl means 22 weighing about 0.5 to 200 grams and a pendulum weight 34 having its center of mass located about 0.1 to 3 inches from a substantially horizontal plane passing through top 30 of projection 28.

As previously noted, when cap 38 is pivoted on the mounting means, its lower surface 42 contacts a relatively small portion of the outer edge 44 of top 30. The "knife-edge" contact thereby created substantially eliminated sliding friction, as well as the entrapment of dirt particles and corroded material between the cap 38 and the top 30. As a result, the acceleration required for proper actuation of the pawl means 22 can be sustained at a preselected magnitude in the order of at least about 0.1 g and preferably at least about 0.3 g without periodic maintenance for as much as 50 years or more.

An additional advantage resides in the detent action provided by the pivotal movement between the cap 38 and the top 30 of projection 28. The pendulum means does not commence to move until the center of mass of the pendulum weight 34 is aligned with a substantially vertical plane passsing through edge 44 of top 30. Accelerations below the preselected magnitude, such as those generated by road noise and the like, have a magnitude insufficient to bring the pendulum weight's center of mass into alignment with the substantially vertical plane through edge 44. The pendulum means remains in the substantially vertical position and is not set in motion until its actuating movement is required. Hence, the mounting means is less subject to wear and the distance moved by the pendulum means during actuation of the pawl means 22 remains constant. Accordingly, the retractor has higher reliability and lower maintenance costs than retractors inertially actuated by pendulum means suspended from a ball and socket type mount.

The retractor which has been disclosed herein can, of course, be modified in numerous ways without departing from the scope of the invention. Arm 26 need not be parallel to the floor of the vehicle and projection 28 need not be normal to the arm 26. In each case, however, the top 30 of the projection 28 must be substantially parallel to the floor of the vehicle. The height, $h$, of the projection 28 can range from about 0.02 to 3 inches, preferably from about 0.05 to 0.5 inch, and its configuration may be varied and include a configuration which is cylindrical (as shown in the drawing) of frusto-conical. Upper surface 40 of cap 38 can be cammed and pawl means 22 equipped with a downwardly extending ball-shaped projection 46 to provide for uniform movement of the pawl means 22 upon displacement of the pendulum means due to accelerations radially operable thereon. A spring means such as a spring 50 having one end riveted or otherwise secured to the support means 12 and the other end contacting the top 48 of the pawl means 22 may optionally be employed to hold the pawl means 22 in contact with the cap 38, and, in one embodiment, the spring means tension may be adjustable, as by adjustment of the screw means 51, to change the preselected magnitude of acceleration under which the pawl means activates. These and other modifications are intended to fall within the scope of the present invention.

Having thus described the invention in rather full detail, it will be understood that these details need not be strictly adhered to but that various changes and modifications may suggest themselves to one skilled in the art, all falling within the scope of the invention as defined by the subjoined claims.

I claim:
1. A safety belt retractor, comprising:
   a. support means;
   b. reel means rotatably mounted on said support means;
   c. belt means attached to said reel means for protraction and retraction with respect thereto;
   d. biasing means for urging said reel means in a retracting direction;
   e. ratchet means mounted in connected to said reel means for rotation therewith;
   f. pawl means mounted on said support means for engaging said ratchet means to stop rotation of said reel means and thereby prevent further protraction of said belt means; and
   g. actuating means responsive to acceleration of said vehicle and including (1) mounting means comprising an arm provided with an upwardly extending projection, the top of said projection being substantially parallel to the floor of the vehicle and having an aperture therein and (2) pendulum means comprising a pendulum weight on the lower end of a shaft, said shaft extending through said aperture and being connected at its upper end to a cap having its upper surface contacting said pawl means and its lower surface supported by substantially the entire surface area of the top of said projection, said pendulum means being freely suspended from said mounting means and being displaceable by inertia from a normally substantially vertical position, such displacement operating to move said pawl means into engagement with said ratchet means.

2. A retractor as recited in claim 1, wherein the top of said projection has an outside diameter of 0.1 to 2 inches.

3. A retractor as recited in claim 1, wherein said pawl means weighs about 0.5 to 200 grams.

4. A retractor as recited in claim 1, wherein said pendulum weight has a center of mass located about 0.1 to 3 inches from a substantially horizontal plane passing through said top.

5. A retractor as recited in claim 1, wherein the upper surface of said cap has a concave portion and said pawl means has a downwardly extending convex projection which contacts said concave portion so as to provide for movement of said pawl means upon displacement of said pendulum means by acceleration radially operably thereon.

6. A retractor as recited in claim 1, including spring means for holding said pawl means in contact with said upper surface of said cap.

7. A retractor as recited in claim 5, wherein said projection has a substantially cylindrical configuration.

8. A retractor as recited in claim 1, including spring means supported by said support means and connected to said pawl means biasing said pawl means in contact with said cap.

9. A retractor as recited in claim 8, including adjustable means for varying the means tension.

* * * * *

PO-1050
(5/69)

UNITED STATES PATENT OFFICE
CERTIFICATE OF CORRECTION

Patent No. 3,838,831         Dated October 1, 1974

Inventor(s) Lon E. Bell

It is certified that error appears in the above-identified patent and that said Letters Patent are hereby corrected as shown below:

Column 5, line 4, "of" should read -- or --;

line 36, "connected" should read -- connection --;

Column 6, line 17, before "0.1", -- about -- should be inserted;

line 31, "operably" should read -- operable --.

Signed and sealed this 17th day of December 1974.

(SEAL)
Attest:

McCOY M. GIBSON JR.
Attesting Officer

C. MARSHALL DANN
Commissioner of Patents